United States Patent
Tanaka

(10) Patent No.: US 10,547,824 B2
(45) Date of Patent: Jan. 28, 2020

(54) DATA PROCESSING APPARATUS, IMAGING APPARATUS AND DATA PROCESSING METHOD

(71) Applicant: CANON KABUSHIKI KAISHA, Tokyo (JP)

(72) Inventor: Shin Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 15/516,814

(22) PCT Filed: Oct. 15, 2015

(86) PCT No.: PCT/JP2015/005213
§ 371 (c)(1),
(2) Date: Apr. 4, 2017

(87) PCT Pub. No.: WO2016/067541
PCT Pub. Date: May 6, 2016

(65) Prior Publication Data
US 2017/0295355 A1 Oct. 12, 2017

(30) Foreign Application Priority Data
Oct. 27, 2014 (JP) ................................ 2014-218646

(51) Int. Cl.
H04N 13/00 (2018.01)
H04N 13/128 (2018.01)
G06T 7/593 (2017.01)

(52) U.S. Cl.
CPC .......... *H04N 13/128* (2018.05); *G06T 7/593* (2017.01); *G06T 2207/10024* (2013.01)

(58) Field of Classification Search
CPC .......................... H04N 13/0022; H04N 13/128
(Continued)

(56) References Cited

U.S. PATENT DOCUMENTS 6,897,976 B2 5/2005 Tanaka et al.
8,761,492 B2 6/2014 Hirai et al.
(Continued)

FOREIGN PATENT DOCUMENTS

CN 103179414 A 6/2013
EP 2 608 549 A2 6/2013
(Continued)

OTHER PUBLICATIONS

Jun. 5, 2018 European Search Report in European Patent Appln. No. 15854692.9.
(Continued)

*Primary Examiner* — William C Vaughn, Jr.
*Assistant Examiner* — Jerry T Jean Baptiste
(74) *Attorney, Agent, or Firm* — Venable LLP

(57) ABSTRACT

Provided is a data processing apparatus for calculating confidence coefficient data to indicate a confidence of pixel values of a second image data. The apparatus acquires similarity between a pixel value of a first pixel of the first image data corresponding to a target pixel of the confidence coefficient data, and each pixel value of a plurality of second pixels around the first pixel. The apparatus acquires the confidence coefficient by determining an estimated pixel value in the third pixel of the second image data corresponding to the first pixel, based on the similarity of each of the plurality of second pixels, each pixel value of the plurality of fourth pixels around the third pixel and the pixel value of the third pixel and by comparing the pixel value of the third image and the estimated pixel value in the third pixel.

12 Claims, 10 Drawing Sheets

(58) Field of Classification Search
USPC .......................................................... 382/154
See application file for complete search history.

(56) References Cited

U.S. PATENT DOCUMENTS

| | | | |
|---|---|---|---|
| 8,805,065 | B2 | 8/2014 | Dai |
| 8,988,592 | B2 | 3/2015 | Takahashi |
| 9,053,393 | B2 | 6/2015 | Yoshii et al. |
| 2012/0321172 | A1* | 12/2012 | Jachalsky ............... G06T 7/593 382/154 |
| 2013/0162763 | A1 | 6/2013 | Cheng |
| 2013/0215107 | A1* | 8/2013 | Kimura ................... G06T 15/00 345/419 |
| 2014/0093159 | A1 | 4/2014 | Nguyen et al. |
| 2015/0156404 | A1 | 6/2015 | Takahashi |
| 2015/0235109 | A1 | 8/2015 | Yoshii et al. |
| 2015/0363913 | A1* | 12/2015 | Higgins ................ G06T 3/4015 382/164 |
| 2016/0019437 | A1* | 1/2016 | Choi ....................... G06T 7/593 382/218 |
| 2017/0148137 | A1 | 5/2017 | Tanaka |

FOREIGN PATENT DOCUMENTS

| | | | |
|---|---|---|---|
| EP | 2608549 | A2 * | 6/2013 |
| JP | 2000-121319 | A | 4/2000 |
| JP | 2011-216087 | A | 10/2011 |
| JP | 2012-078942 | A | 4/2012 |
| JP | 2013-114477 | A | 6/2013 |
| JP | 2013-140437 | A | 7/2013 |
| JP | 2013-157950 | A | 8/2013 |
| JP | 2013-239119 | A | 11/2013 |
| WO | 2013/145554 | A1 | 10/2013 |

OTHER PUBLICATIONS

Matsuo, Takuya et al. "Depth Map Refinement with Weighted Cross Bilateral Filter", Journal of the Institute of Image Information and Television Engineers, vol. 66, No. 11, pp. J434-J443, 2012.
Shin Tanaka, U.S. Appl. No. 15/355,197, filed Nov. 18, 2016.
International Preliminary Report on Patentability dated May 11, 2017, in International Patent Application No. PCT/JP2015/005213.
Sep. 29, 2019 Chinese Official Action in Chinese Patent Appln. No. 201580057614.6.

* cited by examiner

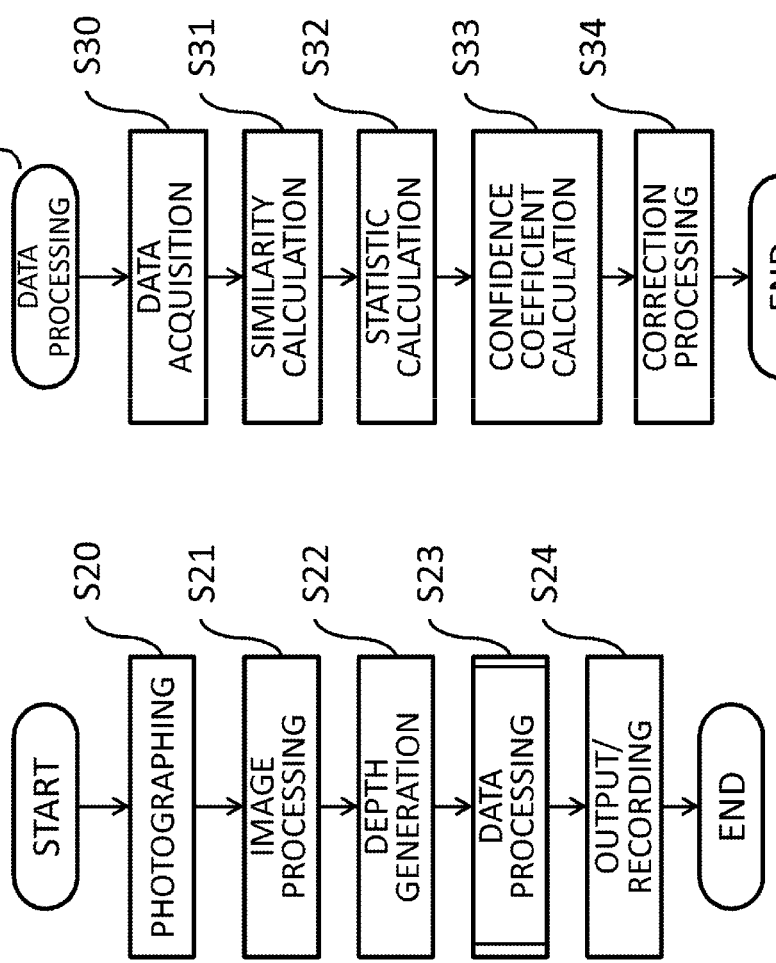
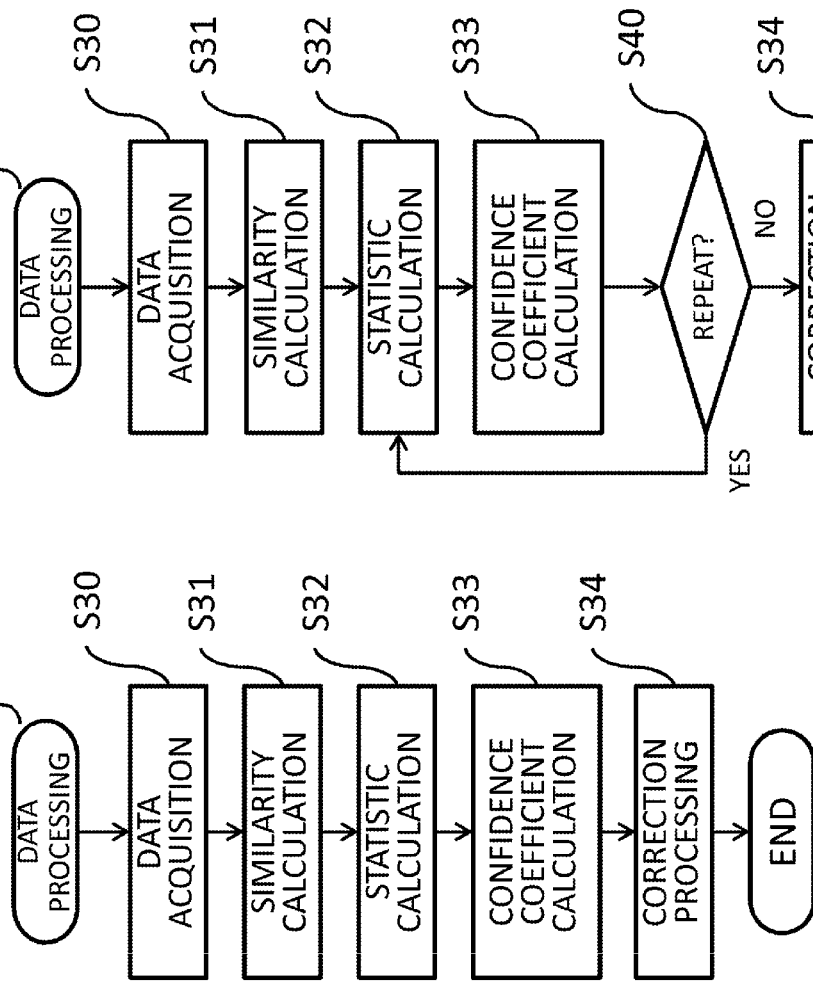
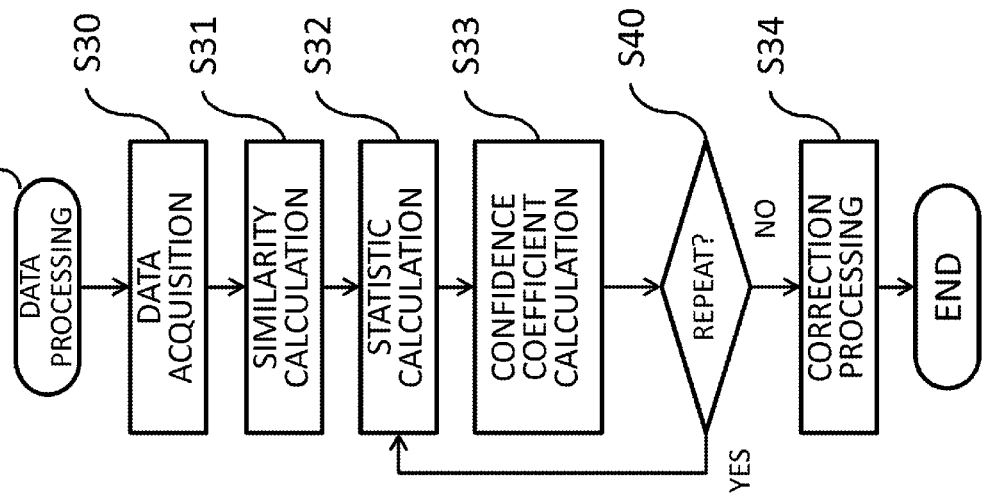

FIG. 4A
PHOTOGRAPHED IMAGE
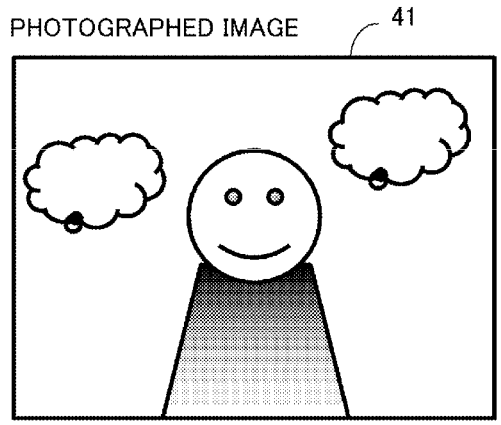
FIG. 4B
DEPTH IMAGE
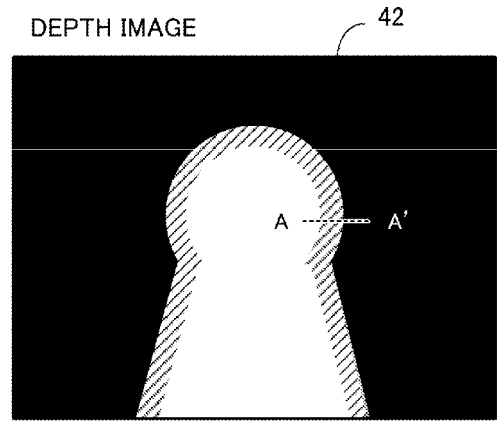
FIG. 4C  A-A' CROSS-SECTION DEPTH VALUE
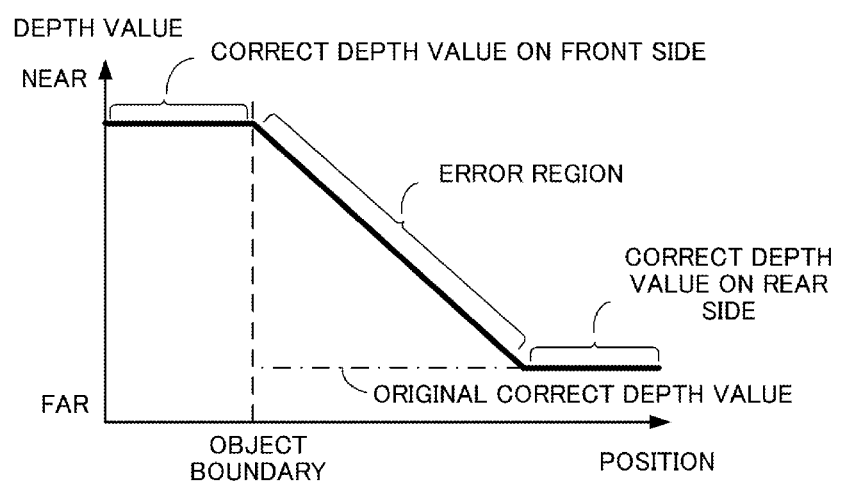
FIG. 4D
CONFIDENCE COEFFICIENT MAP
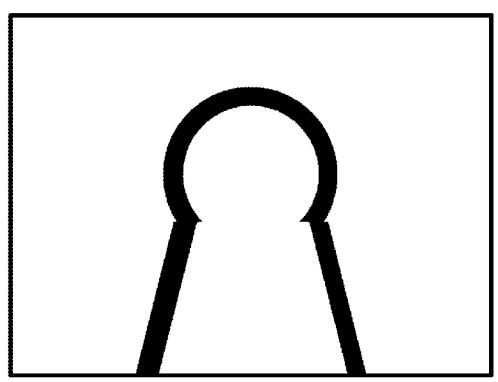

FIG. 9
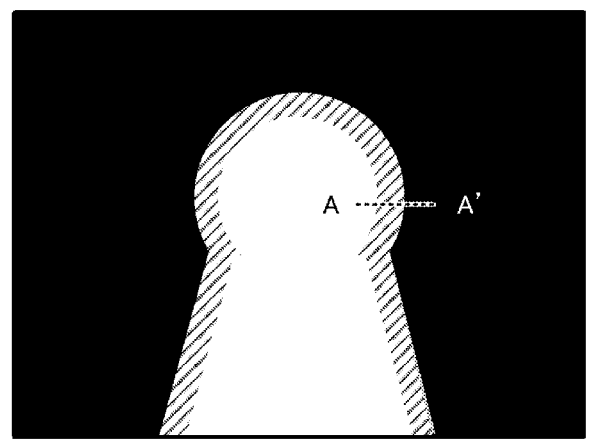
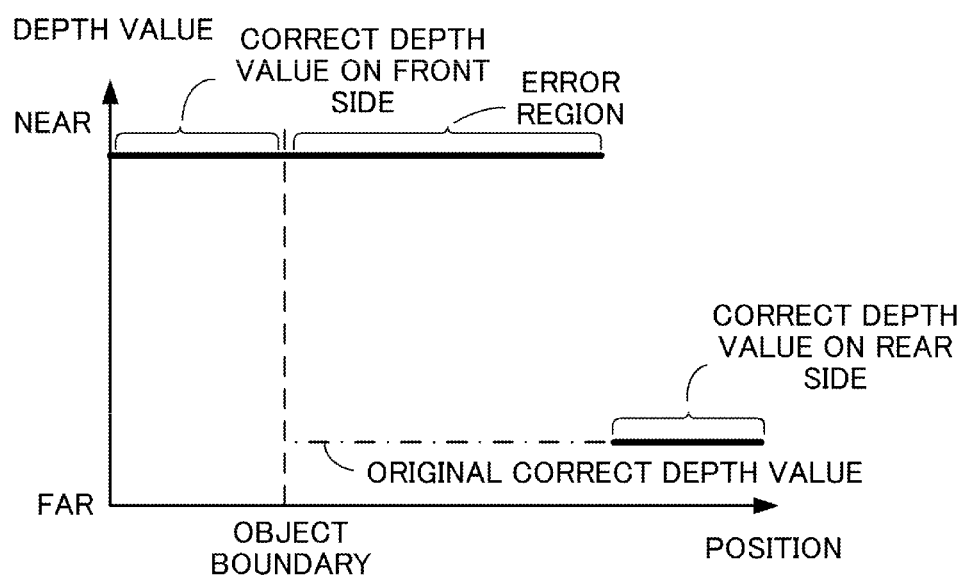

DATA PROCESSING APPARATUS, IMAGING APPARATUS AND DATA PROCESSING METHOD

TECHNICAL FIELD

The present invention relates to a data processing apparatus, an imaging apparatus and a data processing method.

BACKGROUND ART

Methods for acquiring or calculating a depth image or motion image which represents the distribution of depth information or motion information from a photographed image have been proposed. The depth information or motion information acquired from the photographed image, however, often includes an error. For example, in the case of determining the depth information or motion information by acquiring the correspondence of two images using a template matching technique, a major error could be generated in a boundary of objects in the images. Such an error is generated when one template includes objects of which depths and motions are different. The acquired depth information or motion information often becomes incorrect information, the depth or motion value of which is an intermediate value between the distances or motion values of these objects. The size of the region having the error depends on the size of the template. A similar error could be generated in the boundary of the object, even in the case of determining the depth information or motion information using a method other than the template matching technique.

Examples of a method for correcting information of each pixel of the depth image or motion image including an error are as follows.

In Patent Literature 1, a confidence coefficient of depth information of each pixel is calculated, and the depth information is corrected using this confidence coefficient. The confidence coefficient of the depth information is calculated based on the magnitude of the brightness value in the photographed image, the magnitude of the change of the brightness, frequency characteristic or motion information. This allows to make the confidence coefficient to be small in an area where there is no texture or in an area where motion is large. However, if the object boundary of each object has texture and motion thereof is small, the confidence coefficient is calculated high in the object boundary. In other words, according to the method of Patent Literature 1, the confidence coefficient is calculated without considering the object boundary.

In Patent Literature 2, the depth information is corrected as follows. First, clustering is performed based on the pixel values of the photographed image or the depth values of the depth image, and each pixel is classified into a plurality of classes. The class of the correction target pixel is determined using a pixel value statistic (e.g. mean value), the correction target pixel, and the pixel value of the pixel periphery to the correction target pixel. Then the depth value of the correction target pixel is replaced with a representative depth value (e.g. mean value of depth values within the class). By this processing, correction can be performed considering the spatial continuity of the pixel values. However if an error is included in the depth values in the class, the representative depth value in the class is shifted from the correct depth value, and correction becomes insufficient.

In Non-patent Literature 1, a depth image is corrected by a weighted cross-bilateral filter using depth information, brightness information of a photographed image, and confidence coefficient information derived from these pieces of information. In other words, a peripheral pixel, of which difference of the depth value or brightness is large compared with the correction target pixel, is regarded as unreliable, and is not used for the correction processing. However, the confidence coefficient calculated like this is not the confidence coefficient of the depth information itself, but is simply a relative confidence coefficient among the pixels. Further, according to this method, the correction target pixel that includes an error has a large depth difference compared with the peripheral pixels that does not include an error, and therefore correct depth information of the peripheral pixels that does not include an error cannot be used for correction processing. Patent Literature 3 discloses that the confidence coefficient of the depth value, when the depth image is encoded, is determined.

CITATION LIST

Patent Literature

[PTL 1] Japanese Patent Application Laid-Open No. 2013-239119
[PTL 2] Japanese Patent Application Laid-Open No. 2012-078942
[PTL 3] Japanese Patent Application Laid-Open No. 2013-157950

Non Patent Literature

[NPL 1] Takuya Matsuo, et. al., "Depth Map Refinement with Weighted Cross Bilateral Filter", Journal of the Institute of Image Information and television Engineers, Vol. 66, No. 11, pp. J434-J443 (2012)

SUMMARY OF INVENTION

Technical Problem

As described above, in any prior art of Patent Literature 1, Patent Literature 2 and Non-patent Literature 1, information that includes an error in the object boundary cannot be corrected accurately. This is because the reliability of each pixel (the amount of errors) cannot be correctly evaluated. To perform correction appropriately, it is necessary to acquire the confidence coefficient of the information that indicates the reliability of information including an error in the object boundary.

It is an object of the present invention to provide a data processing apparatus that generates confidence coefficient information, in which a pixel including an error in the object boundary, has a low confidence coefficient, and the other errorless pixels have a high confidence coefficient.

Solution to Problem

A first aspect of the present invention is a data processing apparatus for calculating, from first image data and second image data, confidence coefficient data to indicate a confidence coefficient of pixel values of at least a part of the pixels of the second image data, the data processing apparatus including: a similarity acquisition unit adapted to acquire similarity between a pixel value of a first pixel of the first image data corresponding to a target pixel of the confidence coefficient data, and each pixel value of a plurality of second pixels in a predetermined peripheral region of the first pixel; and a confidence coefficient acquisition unit adapted to acquire a confidence coefficient, which is a pixel value of the target pixel of the confidence coefficient data, from the similarity of each of the plurality of second pixels, a pixel value of a third pixel of the second image data corresponding to the first pixel, and each of a plurality of fourth pixels located in the predetermined peripheral region of the third pixel and corresponding to each of the plurality of second pixels, wherein the confidence coefficient acquisition unit is further adapted to acquire the confidence coefficient by determining a pixel value which is estimated to be correct in the third pixel, based on the similarity of each of the plurality of second pixels, each pixel value of the plurality of fourth pixels and the pixel value of the third pixel, and comparing the pixel value of the third image and the pixel value which is estimated to be correct in the third pixel.

A second aspect of the present invention is a data processing apparatus for calculating, from first image data and second image data, confidence coefficient data to indicate a confidence coefficient of the pixel values of at least a part of the pixels of the second image data, the data processing apparatus including: a correction unit adapted to correct the second image data based on the first image data and the second image data, and generates corrected second image data; and a confidence coefficient acquisition unit adapted to acquire a confidence coefficient by comparing the corrected second image data and the uncorrected second image data.

A third aspect of the present invention is a data processing method executed by a data processing apparatus for calculating, from first image data and second image data, confidence coefficient data indicating a confidence coefficient of pixel values of pixels of at least a part of the pixels of the second image data, the method including: a similarity acquisition step of acquiring similarity between a pixel value of a first pixel of the first image data corresponding to a target pixel of the confidence coefficient data and each pixel value of a plurality of second pixels in a predetermined peripheral region of the first pixel; and a confidence coefficient acquisition step of acquiring a confidence coefficient, which is a pixel value of the target pixel of the confidence coefficient data, from the similarity of each of the plurality of second pixels, a pixel value of a third pixel of the second image data corresponding to the first pixel, and each pixel value of a plurality of fourth pixels located in the predetermined peripheral region of the third pixel and corresponding to each of the plurality of second pixels, wherein in the confidence coefficient acquisition step, a pixel value, which is estimated to be correct in the third pixel, is determined based on the similarity of each of the plurality of second pixels, each pixel value of the plurality of fourth pixels, and the pixel value of the third pixel, and the pixel value of the third image and the pixel value which is estimated to be correct in the third pixel are compared, whereby the confidence coefficient is acquired.

A fourth aspect of the present invention is a data processing method executed by a data processing apparatus for calculating, from first image data and second image data, confidence coefficient data to indicate a confidence coefficient of pixel values of pixels of at least a part of the second image data, comprising: a correction step of correcting the second image data based on the first image data and the second image data, and generating corrected second image data; and a confidence coefficient acquisition step of acquiring a confidence coefficient by comparing the corrected second image data and the uncorrected second image data.

Further features of the present invention will become apparent from the following description of exemplary embodiments with reference to the attached drawings.

Advantageous Effects of Invention

According to the present invention, a confidence coefficient of information including an error can be set correctly.

BRIEF DESCRIPTION OF DRAWINGS

FIG. 2A is a flow chart of an imaging processing method according to Embodiment 1, and FIG. 2B and FIG. 2C are flow charts of a data processing method according to Embodiment 1.

FIG. 4A to FIG. 4D are diagrams depicting an error included in depth image data according to Embodiment 1.

FIG. 9 is a diagram depicting an error included in depth image data according to Embodiment 3.

DESCRIPTION OF EMBODIMENTS

Embodiments of the present invention will be described in detail with reference to the drawings, but the present invention is not limited to the configuration of each embodiment. Each embodiment may be appropriately combined.

Embodiment 1

Figure 1:
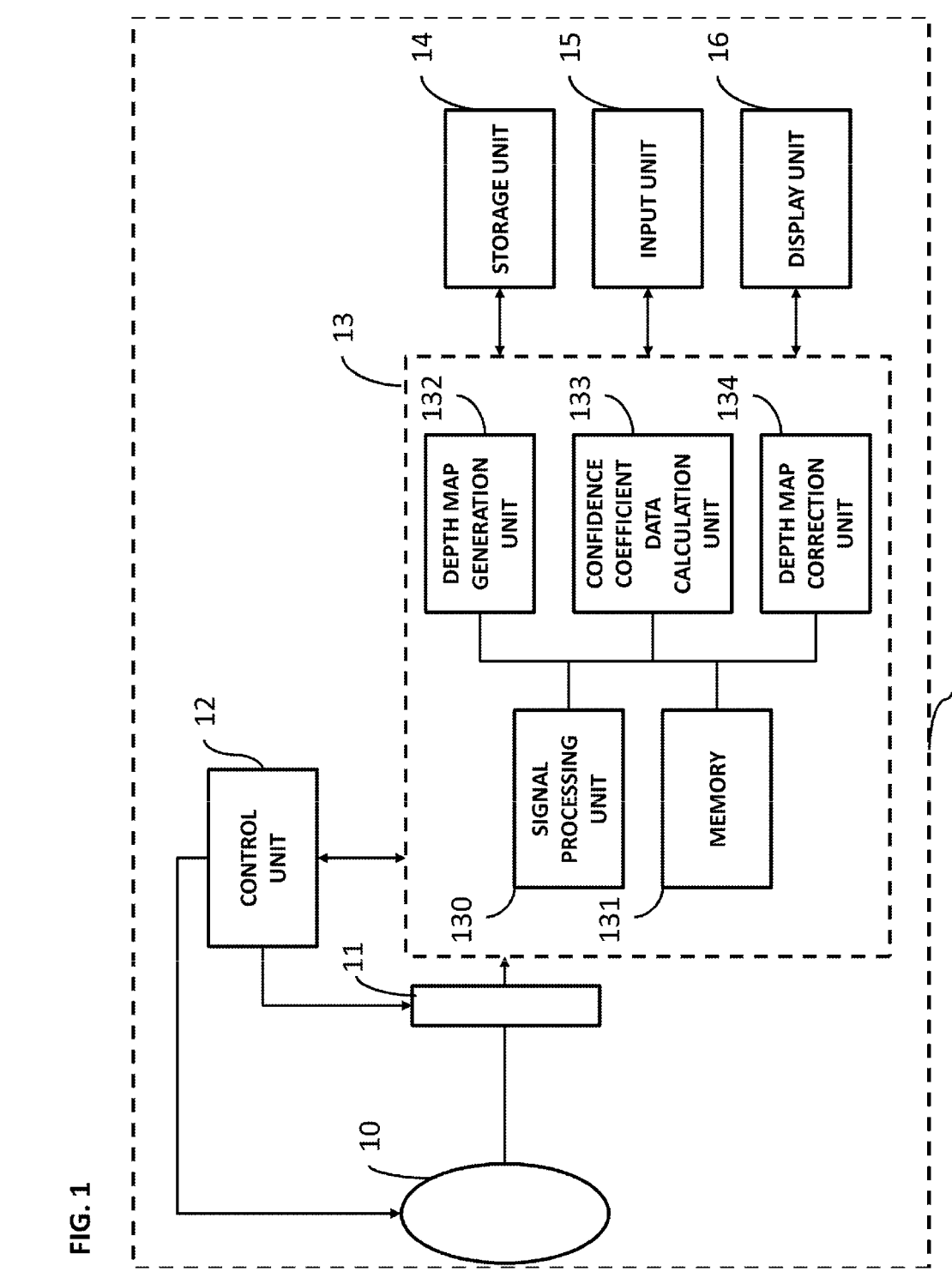
FIG. 1 is a block diagram depicting an example of an imaging apparatus including a data processing apparatus according to Embodiment 1.

FIG. 1 is a block diagram of an imaging apparatus according to Embodiment 1 of the present invention. The imaging apparatus 1 has an imaging optical system 10, an imaging element 11, a control unit 12, a data processing apparatus 13, a storage unit 14, an input unit 15 and a display unit 16. FIG. 2A is a flow chart depicting the processing flow from imaging processing to output/recording processing of the photographed image. Each composing element of the imaging apparatus 1 will be described with reference to the flow chart in FIG. 2A.

The imaging optical system 10 is constituted by a plurality of lenses for forming an image of an incident light on an image plane of the imaging element 11. The imaging element 11 has an image sensor, such as a CCD or CMOS. The image sensor may or may not include a color filter, and may be a three-plate type. The imaging apparatus 1 performs photographing processing S20 by acquiring a signal from each pixel of the imaging element 11.

The data processing apparatus 13 has a signal processing unit 130, a memory 131, a depth map generation unit 132, a confidence coefficient data calculation unit 133 and a depth map correction unit 134. The signal processing unit 130 is a functional unit that executes image processing S21. The image processing S21 includes various signal processing, including AD conversion of an analog signal outputted from the imaging element 11, noise removal, demosaicing, brightness signal conversion, aberration correction, white balance adjustment and color correction. The digital image data outputted from the signal processing unit 130 is stored in the memory 131, and is used for display on the display unit 16, recording (saving) in the storage unit 14, calculating the depth information and generating the depth image data, for example.

The depth map generation unit 132 is a functional unit to execute depth generation processing S22. The depth map generation unit 132 acquires digital image data of the photographed image (hereafter called "photographed image data") outputted from the signal processing unit 130, and generates a depth map, which indicates the depth information of the object, from the photographed image data. The depth map is data constituted by a plurality of depth information, and can be regarded as an image having the depth values as pixel values, hence the depth map is also called a "depth image" or "depth image data". The method for acquiring a depth information of an object is, for example, a method of using photographed image data having different degrees of blur photographed under different photographing conditions (Depth From Defocus method: DFD method) or a method of using photographed image data having different parallaxes (stereo method). The Time of Flight method and Depth From Focus method can also be used. The depth image data generated by the depth map generation unit 132 is stored in the storage unit 14, or is temporarily stored in the memory 131, and used for subsequent processing.

The depth information may be a relative depth of a focus position, or may be an absolute depth from the imaging apparatus during photography. If the depth information is determined from two images, the relative depth from the focus position may be a relative depth from the center position of the focus positions of the two images to the object, or may be a relative depth from a focus position of one of the images to the object. The absolute depth or the relative depth may be the depth on the image plane side or the depth on the object side. The depth may be expressed as the depth in actual space, or may be expressed by a quantity that can be converted into the depth of actual space, such as the defocus amount or parallax amount.

Figure 3:
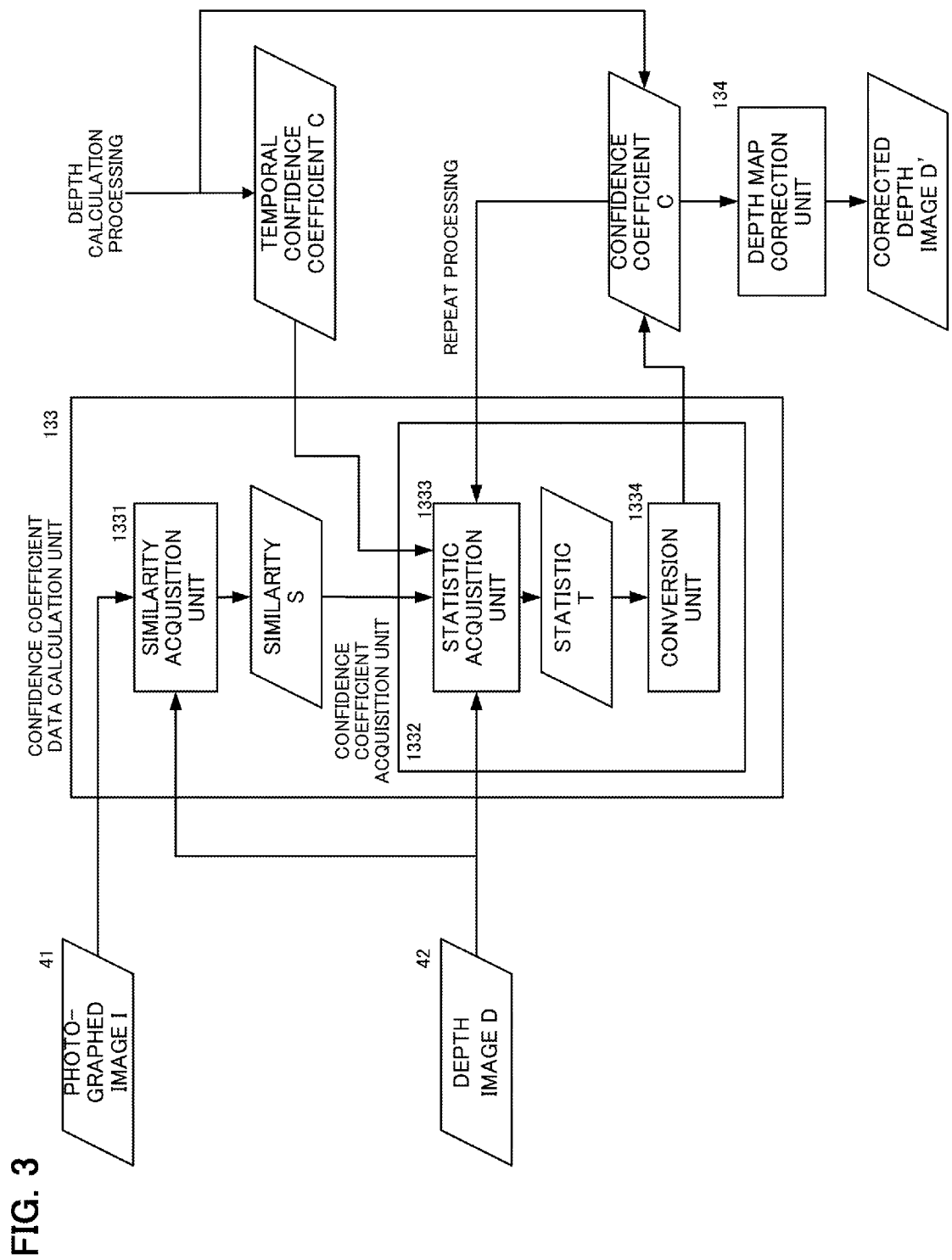
FIG. 3 is a diagram depicting confidence coefficient calculation and image correction according to Embodiment 1.

The confidence coefficient data calculation unit 133 has a function to calculate the confidence coefficient data, which indicates the confidence coefficient of each pixel value (depth value) of the depth map generated by the depth map generation unit 132. The confidence coefficient data is information to be an index whether the depth information of each pixel for the depth map is a correct value or not. The confidence coefficient data calculation unit 133 need not determine the confidence coefficient for all the pixels of the depth map, but may determine the confidence coefficient only for a part of the pixels. As shown in FIG. 3, the confidence coefficient data calculation unit 133 includes a similarity acquisition unit 1331 that calculates the similarity of the brightness value, and a confidence coefficient acquisition unit 1332 that calculates the statistic of peripheral pixels using similarity, and calculates the confidence coefficient data from the statistic. The confidence coefficient acquisition unit 1332 includes a statistic acquisition unit 1333 that calculates the statistic, and a conversion unit 1334 that converts the statistic into the confidence coefficient.

The depth map correction unit 134 has a function to correct the depth information of each pixel of the depth image data using: the acquired photographed image data; the depth image data generated by the depth map generation unit 132; and the confidence coefficient information generated by the confidence coefficient data calculation unit 133.

The processing executed by the confidence coefficient data calculation unit 133 and the depth map correction unit 134 correspond to the data processing S23 in FIG. 2A. The data processing S23 will be described in detail later.

The storage unit 14 is a non-volatile storage medium which stores photographed image data, depth image data, confidence coefficient information data, corrected depth image data, parameter data used for the imaging apparatus 1 or the like. For the storage unit 14, any large capacity storage medium which allows high-speed reading and writing can be used. For example, it is preferable that the storage unit 14 includes a flash memory or the like. The input unit 15 is an interface which the user accesses to input information or to change the setting of the imaging apparatus 1. For example, the input unit 15 includes a dial, button, switch, touch panel or the like. The display unit 16 is a display unit constituted by a liquid crystal display, organic EL display or the like. The display unit 16 is used for checking composition during photographing, viewing a photographed or recorded image, and displaying various setting screens and message information, for example. The output/recording processing S24 includes: the recording processing of the photographed image data, depth image data, confidence coefficient image data, corrected depth image data or the like to the storage unit 14; and the display processing to display these items of data on the display unit 16.

The control unit 12 has a function to control each component of the imaging apparatus 1. Functions of the control unit 12 are, for example: automatic focusing using an auto focus (AF), changing the focus position, changing the F value (diaphragm), capturing an image, controlling the shutter or flash (neither illustrated) and controlling the storage unit 14, the input unit 15 and the display unit 16.

The major errors that appear on the depth image data will be described next. The first error is an error that is generated in an area where the depth information changes considerably (object boundary portion). This type of error is generated near a boundary where an object on the front side and an object on the rear side overlap with each other. If such a method as the DFD method, which calculates a depth from the similarity of images, is used, errors of calculated depth information increase in an object boundary portion where information on the front side and information on the rear side mix when depth is calculated.

The second error is an error that disables the acquisition of the depth information (data unavailable). The cause of this error is different depending on the depth acquisition method. In the case of the stereo method, for example, the cause may be a region having no pattern (texture) in the object, or a dark region or a region which cannot be seen from one side due to the difference in parallax (occlusion). This type of error is often generated in a region that includes a plurality of continuous pixels.

The third error is an error that is caused by noise generated in the depth information. If noise is generated, the depth information in objects disperse even if objects are at the same depth.

The data processing S23 will now be described in detail. In the data processing S23 of this embodiment, a confidence coefficient is calculated mainly by evaluating whether there is an error in the depth boundary portion (object boundary portion), which is the first type of the above mentioned errors, and correcting the depth image data on the basis of the confidence coefficient. Now the data processing S23 will be described with reference to the drawings. FIG. 2B is a flow chart depicting the data processing S23 in more detail. FIG. 3 is a diagram depicting the functional blocks of the confidence coefficient data calculation unit 133 and the depth map correction unit 134, along with the flow of the data. FIG. 4A to FIG. 4D are diagrams depicting an example of the processing data.

In step S30, the confidence coefficient data calculation unit 133 acquires photographed image data 41 (first image data) and depth image data 42 (second image data). FIG. 4A shows an example of the photographed image data 41, and FIG. 4B shows an example of the depth image data 42. The photographed image data 41 and the depth image data 42 are images of which view points are approximately the same. For example, the depth image data 42 is image data that includes depth information calculated by a plurality of photographed image data captured under different photographing conditions, and the photographed image data 41 is any one of the plurality of photographed image data based on what depth information was calculated, or on image data generated by combining the plurality of photographed image data. The photographed image data 41 may be a monochrome image (brightness image) or may be a color image.

As mentioned above, the depth image data 42 includes an error in the object boundary portion. In the depth information of the object boundary portion (A-A' portion in FIG. 4B) of the depth image data 42, the depth information of a rear side object (background) includes an error in a region near the object boundary, as shown in FIG. 4C, due to the influence of the depth information of a front side object (human body). To be more specific, this is an error in which the depth information of the rear side object is calculated to be less than the actual depth. This error is generated during the depth map generation processing. The influence of the front side object on calculation error gradually decreases as the distance from the object boundary increases. If a region where the depth information is different from a correct depth value is defined as an error region, the region of the rear side object located in a predetermined range from the object boundary is the error region in this embodiment. The confidence coefficient data calculation unit 133 executes the processing to acquire the confidence coefficient information for correctly extracting an error region, as shown in FIG. 4D. To be more specific, the confidence coefficient data calculation unit 133 executes processing to acquire the confidence coefficient information which indicates a low confidence coefficient in an error region (indicated in black in FIG. 4D), and indicates a high confidence coefficient in the other region (indicated in white in FIG. 4D).

In step S31, the similarity acquisition unit 1331 calculates the similarity S between a pixel value of a pixel (first pixel) in the photographed image corresponding to a target pixel for which the confidence coefficient is calculated (target pixel), and a pixel value of a plurality of pixels in the peripheral region thereof (a plurality of second pixels). For example, if the photographed image is a monochrome brightness image, the similarity S is calculated as a brightness difference as follows.

[Math. 1]

$$S(q) = |I(p) - I(q)| \quad \text{(Expression 1)}$$

where S denotes the similarity (similarity is higher as this value is smaller, and is lower as this value is greater), I denotes a brightness value of the photographed image, p denotes a position of the target pixel for which the confidence coefficient is calculated, and q is a position of a peripheral pixel of the target pixel for which the confidence coefficient is calculated.

If the photographed image is a color image, the similarity S is calculated as a Euclidean distance of a color difference as follows.

[Math. 2]

$$S(q) = \sqrt{(R(p) - R(q))^2 + (G(p) - G(q))^2 + (B(p) - B(q))^2} \quad \text{(Expression 2)}$$

R, G and B indicates red, green and blue color channels respectively. The similarity calculation method is not limited to the above mentioned depth calculation, but may be any method, such as a Manhattan distance calculation method. The color image may be converted into another color space, such as the CIELab color space, or the YUV color space, where the above mentioned similarity calculation may be performed.

The similarity acquisition unit 1331 calculates a weight W, which is used for statistic calculation (S32), from the similarity S. The weight W is a value between 0 to 1, and is determined to be a value closer to 1 as the similarity S is higher, and to be a value closer to 0 as the similarity S is lower. In other words, the weight W is 1 when the value of the similarity S is set to 0 in Expressions 1 and 2, and becomes closer to 0 as the value of the similarity S is greater. A threshold U may be set for the similarity S, and the weight W may be determined as follows.

[Math. 3]

$$W(q) = \begin{cases} 1 & (S(q) \le U) \\ 0 & (S(q) > U) \end{cases} \quad \text{(Expression 3)}$$

According to Expression 3, the weights W of peripheral pixels, of which similarities S are smaller than the threshold U (which means similar), are determined to be 1, and the weights W of the other peripheral pixels are determined to be 0. Since the similarity S and the weight W are related like this, the similarity S and the weight W can be regarded as the same.

In step S32, the statistic acquisition unit 1333 calculates a statistic T of a pixel (third pixel) in the depth image data 42 corresponding to the target pixel for which the confidence coefficient is calculated. The statistic T is a value for evaluating how much the depth value in the depth image data 42 departed from an estimated true value. The statistic T is calculated as a value corresponding to the difference between a depth value that is estimated to be correct in the target pixel and an actual depth value based on a depth value between the calculation target pixel (third pixel) and peripheral pixels (a plurality of fourth pixels) thereof, and the similarity S in the photographed image. In this case, the statistic T is calculated by performing weighted averaging processing on the depth value of the target pixel and the depth values of the peripheral pixels using the weight W determined above as the weight. If the weight W is determined as in Expression 3, the statistic T can be calculated using only the depth values of pixels of which pixel values are similar in the photographed image (pixels of the same object) out of the peripheral pixels.

The statistic T can be determined, for example, as an absolute value of the difference between the weighted average value of the depth values of the peripheral pixels and the depth value of the target pixel as follows.

[Math. 4]

$$T(p) = \left| \frac{\sum_{q \in Q} W(q) D(q)}{\sum_{q \in Q} W(q)} - D(p) \right|$$ (Expression 4)

T denotes a statistic, D denotes a depth value, and Q denotes a peripheral pixel range (a set of pixels q). If the peripheral pixel range Q is too large, the prerequisite "values of the depth information are similar if the brightness (color) is similar" are contradicted, and a new error may be generated. Moreover, the operation volume also increases. If the peripheral pixel range Q is too small, on the other hand, a number of pixels having a correct depth, included in the peripheral pixel range Q, decreases in the calculation of the statistic T in the error region, which may make it difficult to perform confidence coefficient calculation in step S33 properly. Therefore it is preferable to predetermine the size of the peripheral pixel range Q based on the size of the error region generated in the object boundary. For instance, if template matching is used to calculate the depth, the size of the error region is determined by the window size of the template matching. The size of the peripheral pixel range Q may be determined to be about double the window size, for example.

The first term in the absolute value of the right side of Expression 4 can be regarded as a depth value that is estimated to be correct in the target pixel, which is determined from the depth values of the peripheral pixels using similarity in the photographed image as a weight. Therefore, Expression 4 determines a value corresponding to the difference between the depth value that is estimated to be correct in the target pixel and the actual depth value. As mentioned above, the statistic T need not always be calculated by Expression 4, as long as the deviation amount of the depth information of the target pixel, deviating from the true value, can be evaluated while taking into account similarity in the photographed image. For example, the statistic T may be calculated according to the following Expression 5.

[Math. 5]

$$T(p) = \frac{\sum_{q \in Q} W(q) |D(p) - D(q)|}{\sum_{q \in Q} W(q)}$$ (Expression 5)

If Expression 5 is used, the statistic T is determined as a weighted average value of the absolute value of the difference of the correction target depth D(p) and each peripheral pixel depth D(q). By this calculation method as well, the statistic T indicates the difference between the depth value that is estimated to be correct in the target pixel and the actual depth value.

The statistic T can also be determined by other calculation formulae, such as further adding a weight expressed by Gaussian distribution having a certain dispersion to Expression 4 or 5 according to the spatial distance |p−q| between the target pixel p and each peripheral pixel q. The weight calculation (S31) and a part of the statistic calculation (S32) may be implemented simultaneously by filter processing. If the weight W is expressed by 0 or 1, as in the case of Expression 3, the statistic T may be calculated by selecting only the pixels of which weight W is 1.

Then in step S33, the conversion unit 1334 calculates the confidence coefficient C. The confidence coefficient C is determined according to the above mentioned statistic T. For example, if the statistic T is calculated by Expression 4, it is determined that the reliability is lower when the statistic T is high, and the reliability is higher when the statistic T is low. Although the method of determining the confidence coefficient C from the statistic T is different, depending on how the statistic T is calculated, the following conversion formula, for example, can be used.

[Math. 6]

$$C(p) = 1 - \frac{T(p) - T_{min}}{T_{max} - T_{min}}$$ (Expression 6)

$T_{min}$ denotes the minimum value of the statistic T, and $T_{max}$ denotes the maximum value of the statistic T. The confidence coefficient C becomes 1 when the statistic T is $T_{max}$, the confidence coefficient C becomes 0 when the statistic T is $T_{min}$, and the confidence coefficient C continuously changes when the statistic T is between 0 and 1.

The confidence coefficient C may be binarized based on the comparison of the statistic T and a threshold. In other words, the confidence coefficient C may be determined as a binary value as follows, regarding a value indicating a high confidence as 1, and a value showing low confidence as 0.

[Math. 7]

$$C(p) = \begin{cases} 1 & (T(p) \leq L) \\ 0 & (T(p) > L) \end{cases}$$ (Expression 7)

L denotes the threshold. In other words, when the statistic T is determined by Expression 4, the confidence coefficient is determined by comparing the absolute value of the difference between the weighted average value of the depth of each peripheral pixel and the correction target depth with the threshold L. In concrete terms, it is determined that the depth value is unreliable if the statistic T is greater than the threshold, and the depth value is reliable if the statistic T is the threshold or less.

Figure 5A:
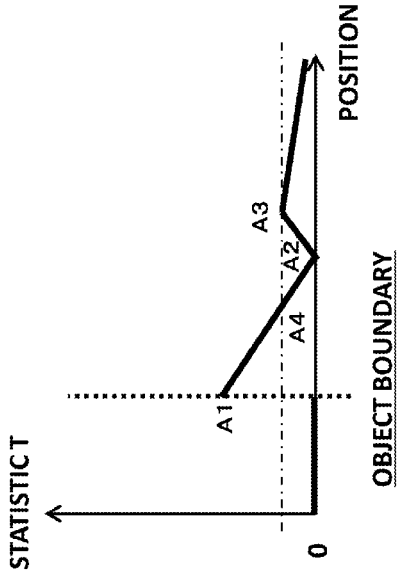
FIG. 5A to FIG. 5C are diagrams depicting confidence coefficient calculation according to Embodiment 1.
Figure 5B:
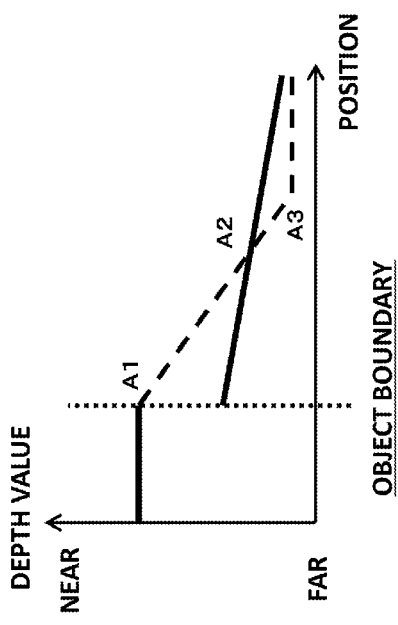
Figure 5C:
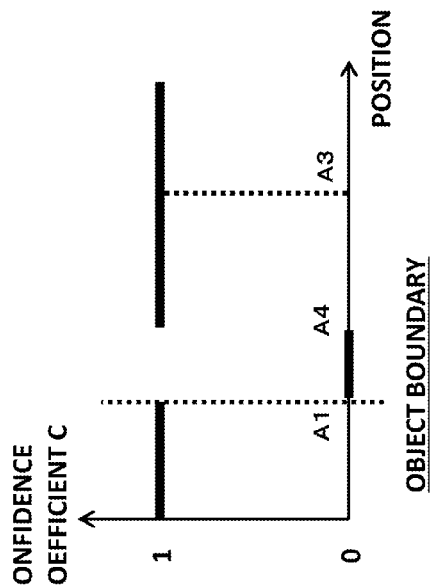

FIG. 5A to FIG. 5C are diagrams depicting examples of the depth value D in the acquired depth image data, the statistic T determined in step S32, and the confidence coefficient C determined in step S33 respectively. FIG. 5A to FIG. 5C show the values in the A-A' cross-sectional portion in FIG. 4B. In FIG. 5A, the dotted line indicates the uncorrected depth value in the A-A' cross-section in FIG. 4B, and the solid line indicates the weighted average depth value of each peripheral pixel depth. The weighted average value of each peripheral pixel depth is calculated using the weight W based on the similarity S in the brightness image, hence the depth values in regions of the different objects are never averaged. It is assumed here that different objects have mutually different brightness distributions (color distributions), and that different object regions are not similar. In FIG. 5A, point A1 indicates the object boundary, point A2 indicates a point where the uncorrected depth value and weighted average value become a same value, and point A3 indicates a boundary between an error region and an errorless region.

FIG. 5B shows the statistic T in the A-A' cross-section in FIG. 4B. The statistic T here is assumed to be determined based on the absolute value of the difference between the uncorrected depth (dotted line in FIG. 5A) and the weighted average value of each peripheral pixel depth (solid line in FIG. 5A), in other words, determined by using Expression 4. The point A4 indicates a point having a same statistic value as the statistic T(A3) at the point A3. In FIG. 5B, if the threshold L of Expression 7 is set to the value of the statistic T(A3) at the point A3, the confidence coefficient becomes 0 in the regions A1 to A4, and the confidence coefficient becomes 1 in the other regions. In other words, the confidence coefficient C shown in FIG. 5C is acquired by setting the threshold L to the statistic T(A3) at the point A3. Since the regions A1 to A4 are error regions, the confidence coefficients of these regions are calculated correctly. If the threshold L is set to a value greater than the value of the statistic T(A3), the region having a low confidence coefficient becomes narrower. If the threshold L is set to a value smaller than the value of the statistic T(A3), a wider region can have a low confidence coefficient, but a portion near the point A3, which is not an error region, is also regarded as having a low confidence coefficient. Considering this, it is preferable to use the statistic T(A3) at the point A3 as the threshold L of Expression 7.

However, the threshold L need not always be the statistic T(A3) at the point A3. The threshold L may be determined according to the situation, since an appropriate effect can be implemented whether the value of the threshold L is somewhat higher or lower than the statistic T(A3).

A concrete value of the statistic T(A3) at the boundary (point A3) between an error region and an errorless region changes depending on the depth difference between an object in the foreground and an object in the background included in the photographed image. For example, if the depth difference of the objects is small, the value of the statistic T(A3) at point A3 becomes small compared with the case when the depth difference is large. Therefore in order to prevent a state where reliable depth information is determined as confidence coefficient 0 in the confidence coefficient calculation processing, the value of the statistic T at the point A3, when the depth difference between objects is at the maximum, is predetermined, and this value is used as the threshold L. The maximum depth difference is, for example, a difference between the depth corresponding to 0 and the depth corresponding to 255 if the information on depth is expressed in 8-bit format. The position of the point A3, that is a number of pixels that exist between: the boundary of the error region and errorless region; and the object boundary, can be estimated in advance based on the depth map calculation method. For example, if the template matching is used, it is estimated that the position which is distant from the object boundary by a number of pixel equivalent to the window size becomes the boundary between the error region and the errorless region.

If the threshold L is determined like this, the region where the confidence coefficient is determined as 0 becomes small in a boundary region in which the depth difference between objects is small, but a reliable region will never be determined as the confidence coefficient 0. As described above, the threshold L is preferably determined in advance by calculation, simulation or the like according to the situation.

The threshold L may be dynamically changed, instead of being set to a predetermined value. As mentioned above, the value of the statistic in the boundary between an error region and an errorless region is determined primarily by the depth difference between a foreground object and a background object. Therefore the threshold L may be determined based on a difference between the maximum value and the minimum value of the depth in the peripheral area of the target pixel for which the confidence coefficient is calculated. Then the confidence coefficient can be calculated more appropriately.

Although confidence coefficients can be acquired (that is, an error region can be determined) by the above method, there still remains an unreliable region which was determined as reliable (a region from point A4 to point A3 in FIG. 5C). To improve the accuracy in calculating the confidence coefficient, it is desirable to repeat the confidence coefficient acquisition processing (statistic calculation processing S32 and the confidence coefficient calculation processing S33). FIG. 2C shows a flow chart in the case of repeating the confidence coefficient acquisition processing. A determination processing S40 is added after the confidence coefficient calculation processing S33, but other processing are essentially the same as FIG. 2B. In the second or later processing, however, the confidence coefficient calculated in the immediate preceeding processing is used as a temporal confidence coefficient. For example, if the confidence coefficient Ci is used as the temporal confidence coefficient when the statistic $T_{i+1}$ is calculated, the following Expression 8 can be used as the calculation formula of the statistic.

[Math. 8]

$$T_{i+1}(p) = \left| \frac{\sum_{q \in Q} W(q)C_i(q)D(q)}{\sum_{q \in Q} W(q)C_i(q)} - D(p) \right| \qquad \text{(Expression 8)}$$

Here subscript i indicates that the value is calculated in the i-th (i is 1 or greater integer) processing. The values of the weight W (and similarity S) and the depth value D do not change regardless the repeat count.

In this embodiment, the confidence coefficient calculation result of a pixel which is determined as confidence coefficient 0 is assumed to be correct. Therefore the pixel determined as confidence coefficient 0 in the previous repeat processing is regarded as the confidence coefficient 0, without calculation being performed again. In other words, a pixel p of which $C_{i(p)}=0$ is regarded as $C_{i+1}(p)=0$. Thereby not only can the calculation amount be reduced, but a detection error, in which an unreliable pixel is determined as reliable by mistake, can be prevented.

Figure 6A:
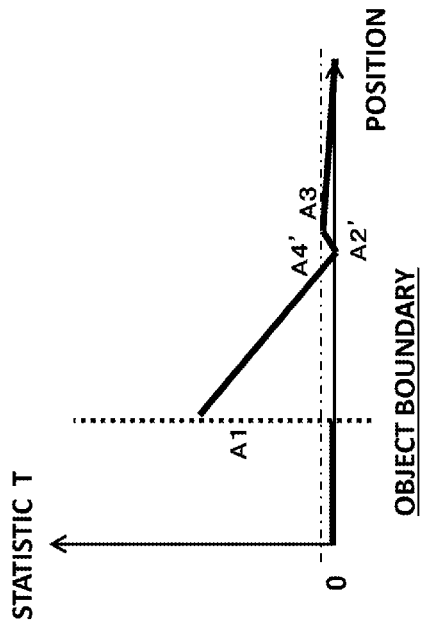
FIG. 6A to FIG. 6C are diagrams depicting confidence coefficient calculation when repeat processing is executed in Embodiment 1.
Figure 6B:
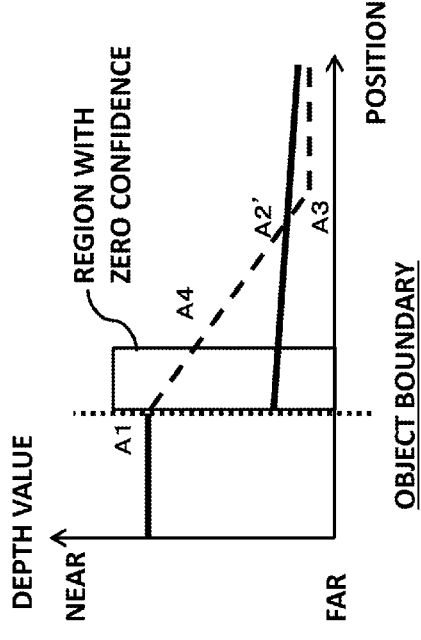
Figure 6C:
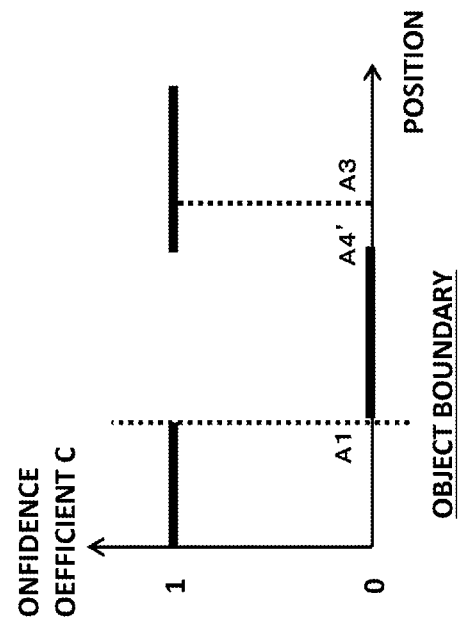

The influence of adding the confidence coefficient C of each peripheral pixel as a weight will be described with reference to FIG. 6A to FIG. 6C. FIG. 6A to FIG. 6C show the depth value D, statistic T and confidence coefficient C respectively, just like FIG. 5A to FIG. 5C. Here it is assumed that the region from point A1 to point A4 shown in FIG. 6A has a low confidence coefficient, and the other region has a high confidence coefficient. The solid line in FIG. 6A indicates the weighted average value of each peripheral pixel depth (first term in the absolute value in Expression 8) using this confidence coefficient as a weight. Compared with FIG. 5A, the weighted average value is closer to the correct value, since the depth values of the region with the confidence coefficient 0 already calculated are not used for calculating the weighted average value. As shown in FIG. 6B, the statistic T calculated by Expression 8 becomes a value greater than FIG. 5B in the error region, because the weighted average value is closer to the true value. Therefore if the value of statistic T at point A3 is used as the threshold L, as mentioned above, a wider region (region for point A1 to point A4') can have a confidence coefficient 0. By repeating the above processing, a region which is determined as the confidence coefficient 0 and an error region can be matched more accurately. For the threshold L in the repeat processing, a plurality of values can be predetermined using calculation, simulation or the like, as mentioned above. Under this condition, it is preferable to decrease the threshold each time the number of times of repeat processing increases. The ways of determining the end of repeat determination processing S70 are, for example: determining whether a predetermined repeat count is reached; determining whether a number of pixels, which are newly determined as the confidence coefficient 0, is a predetermined value or less; or determining whether the dispersion of a statistic in a reliable region, where the confidence coefficient is not 0, is a predetermined value or less. Further, an approximate number of errors that remain after correction processing can be calculated by the value of the statistic, hence whether the repeat processing is performed may be determined based on the value of the statistic.

Expression 8 can be used not only for the second and later repeat processing, but also for the first calculation processing (including the case of not performing repeat processing) instead of Expression 4. In this case, the temporal confidence coefficient ($C_0$) must be calculated by a method that is different from the above mentioned method. This method is not especially restricted. For example, the confidence coefficient acquired when the depth map generation unit 132 calculates the depth information may be used as the temporal confidence coefficient. For example, the depth map generation unit 132 can calculate the confidence coefficient based on the degree of texture of the object, the brightness values or the like in the photographed image. In concrete terms, it is determined that the depth information in a region where there is not much texture or a region of which brightness is low has a low confidence coefficient.

The above mentioned confidence coefficient calculation method can also be used for evaluating errors other than errors in an object boundary. For example, this confidence coefficient calculation method can be used for evaluating errors that are generated in a region having a measurable size when the depth is calculated. By this method, the confidence coefficient can be determined even for a region where a major error is generated within a same object.

Then in step S34, the depth map correction unit 134 corrects the depth map using the confidence coefficient calculated in step S33. An example of the correction processing is the following filter processing.

[Math. 9]

$$D'(p) = \frac{\sum_{q \in Q'} G_{\sigma_s}(|p-q|) G_{\sigma_r}(|I(p)-I(q)|) Th(C(q)) D(q)}{\sum_{q \in Q'} G_{\sigma_s}(|p-q|) G_{\sigma_r}(|I(p)-I(q)|) Th(C(q))}$$ (Expression 9)

In Expression 9, D denotes an uncorrected depth value, and D' denotes a corrected depth value. I denotes a brightness value or color information of a pixel in the photographed image data. p denotes a position of a correction target pixel in the depth image data, and q denotes a position of a peripheral pixel of the correction target pixel p. G denotes a Gaussian function ($\sigma_s$ and $\sigma_r$ are dispersion values), where $G_{\sigma_s}$ and $G_{\sigma_r}$ may be different Gaussian functions, or may be the same Gaussian functions. Q' denotes a calculation range (a set of the pixels q), and if S is large, a number of peripheral pixels q also increases. C denotes a finally acquired confidence coefficient. Th is set to 1 if the confidence coefficient C is high, and is set to 0 if the confidence coefficient C is low. For example, if the confidence coefficient C is in a numeric range of 0 or more, 1 or less, then Th is set to 1 if the confidence coefficient C is 0.5 or more, and is set to 0 if C is less than 0.5. If C takes only two values (0 and 1), then Th(C) may be replaced with C (that is, Th(C)=C).

According to this embodiment, a correct confidence coefficient can be set for the depth image data. If the depth information is corrected based on the correct confidence coefficient information, the depth image data can be corrected at an even higher accuracy.

Modification of Embodiment 1

Figure 7:
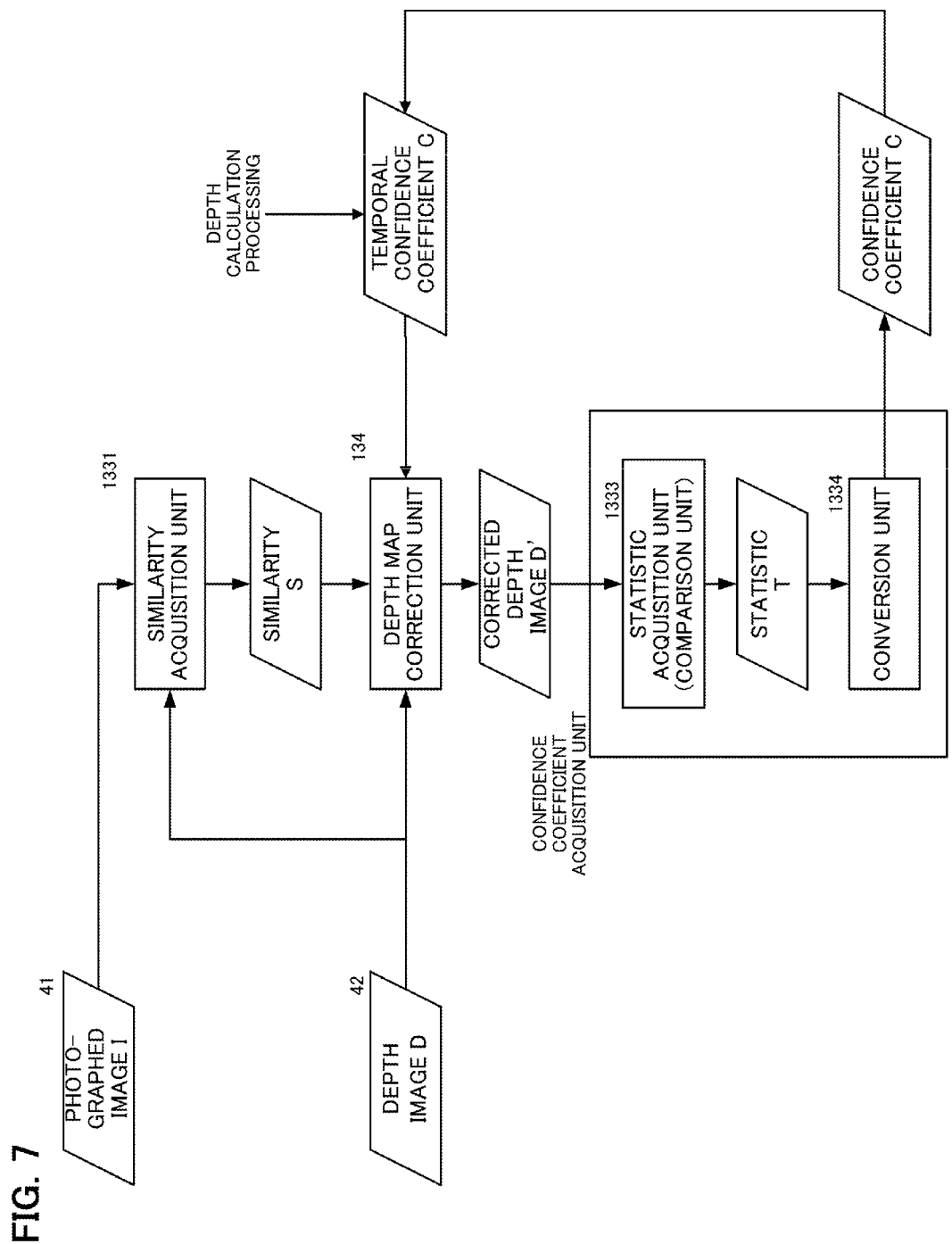
FIG. 7 is a diagram depicting confidence coefficient calculation and image correction according to a modification of Embodiment 1.

The first term of Expression 8 and Expression 9 have a very similar form. Since Expression 9 is the corrected depth information, the statistic T defined by Expression 8 (and Expression 4) can be regarded as the absolute value of the difference between the corrected depth information and the uncorrected depth information. Therefore the confidence coefficient calculation processing of Embodiment 1 can also be implemented by the processing shown in FIG. 7. In other words, the similarity acquisition unit 1331 calculates the similarity S between the target pixel p and peripheral pixels q thereof in the photographed image (Expression 1). Then the depth map correction unit 134 corrects the depth value of the target pixel p using the depth value D of each peripheral pixel q in the depth image, with a weight W based on the calculated similarity S (e.g. $G_{\sigma_s}(|p-q|) \times G_{\sigma_r}(S)$) (Expression 9). Then the statistic acquisition unit 1333 calculates, as the statistic T, the absolute value of the difference between the uncorrected depth value D and the corrected depth value D' in the target pixel p (corresponds to Expression 8). Finally, the conversion unit 1334 converts the statistic T into the confidence coefficient C (Expression 6 or Expression 7).

The correction processing for the depth image is not limited to a specific calculation method. The correction processing for the depth image can be any correction processing other than the above mentioned correction processing if the difference of the estimated depth information in the target pixel from the true value can be decreased considering the similarity in the photographed image and the depth information of each peripheral pixel. In other words, the confidence coefficient of depth information may be set by comparing the depth information corrected by any means and the uncorrected depth information. If the above mentioned repeat processing is performed, corrected depth information is acquired, and the confidence coefficient is determined thereafter. If correction is sufficient, the correction processing can be determined to end in this stage, hence the repeat count can be determined based on the correction result.

As mentioned above, if the confidence coefficient calculation processing is repeated, the depth image can be corrected using the confidence coefficient information determined in the preceeding processing. A pixel, which has been determined as unreliable by the preceeding processing, can be determined as the confidence coefficient 0 regardless the value of the statistic. Concrete examples of determining the end of repeat processing are: determining whether a predetermined number of times is reached; determining whether the maximum value of the correction amount by the depth image correction processing becomes a predetermined value or less; whether a number of pixels which are newly determined as confidence coefficient 0 is a predetermined value or less.

In the method of Embodiment 1, the calculation processing for the statistic and the correction processing of the depth image have different content, but in a method of this modification, the major portions of these two calculations can be shared, hence a same operation circuit can be used for these processing, which can reduce cost. Furthermore, the depth image is corrected when the statistic is calculated, hence it is unnecessary to correct the depth image again after the confidence coefficient information is calculated, which decreases the calculation amount.

Embodiment 2

Figure 8:
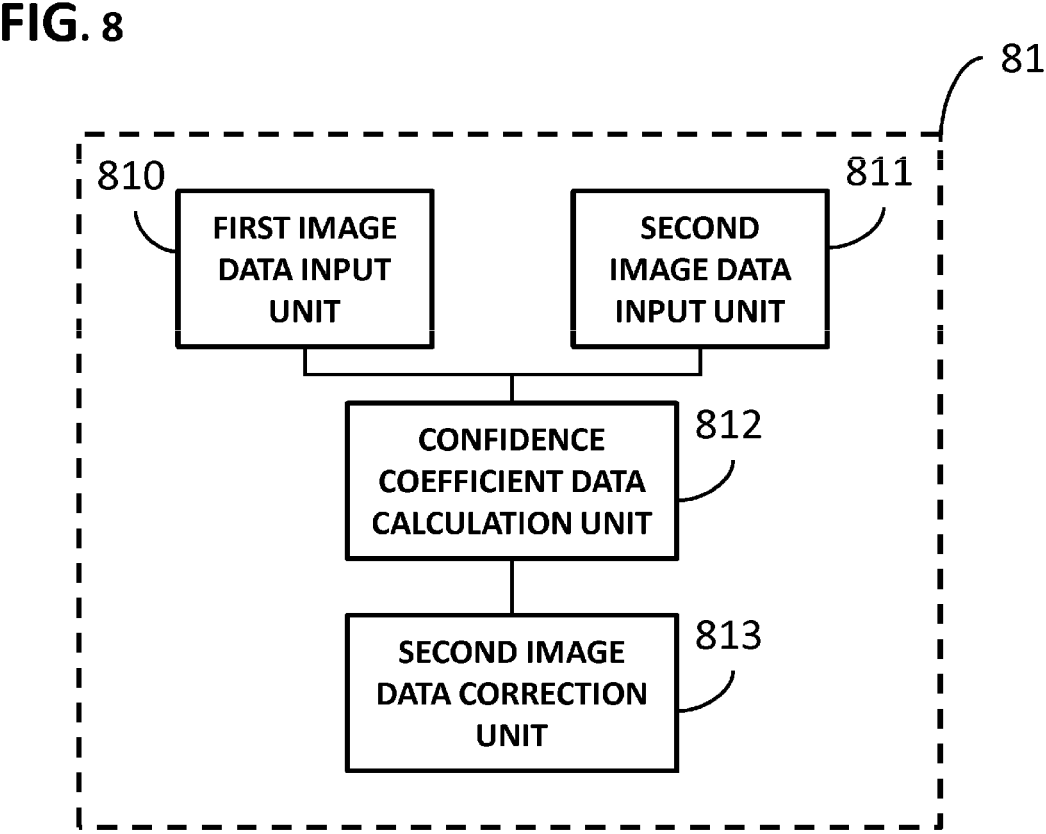
FIG. 8 is a block diagram depicting an example of a data processing apparatus according to Embodiment 2.

In Embodiment 1, the confidence coefficient information data is generated and the depth information is corrected using the photographed image data and the depth image data. Embodiment 2, on the other hand, shows that the confidence coefficient information can be generated and the correction processing can be performed using data other than the photographed image data and the depth image data. FIG. 8 shows a data processing apparatus of Embodiment 2. The flow chart is the same as the flow chart of Embodiment 1. The image processing method according to Embodiment 2 will be described focusing on aspects that are different from Embodiment 1.

The data processing apparatus 81 has a first image data input unit 810, a second image data input unit 811, a confidence coefficient data calculation unit 812, and a second image data correction unit 813. Image data to be a reference (first image data) is inputted to the first image data input unit 810. The first image data may be brightness image data, or may be already corrected depth image data, or depth image data acquired using a method designed in theory not to generate an error in a region near the object edge, for example, may be used. The first image data may be information on infrared light, polarized light or the like. If the brightness image or the like is acquired as the first image data, the data processing apparatus 81 may be included in the imaging apparatus, as shown in FIG. 1. If the first image data is the depth image data, for example, the data processing apparatus may include a data generation unit to generate, for example, the depth image data. If the first image data is the depth image data, I in Expression 1 corresponds to the depth value (not including an error in the object boundary).

Image data to be the calculation target of the confidence coefficient (second image data) is inputted to the second image data input unit 811. The second image data is image data of which view point is approximately the same as the first image data, and is preferably image data representing different information from first image data. The second image data is image data that includes an error in the object boundary. The first image data and the second image data may be calculated by different calculation methods, but that have a same content. The first image data and the second image data need not always have a same angle of view, so it is required that the second data is included in the first image data. In other words, the angle of view of the first image data may be the same as or larger than the angle of view of the second image data.

An example of the second image data, other than the depth image data, is motion data (optical flow). Motion data is data that represents the motion of an object (motion of the camera may be included in some cases). For example, the motion data includes velocity in the horizontal direction (x direction) and in the vertical direction (y direction) for each pixel. Generally, for the motion information of the object, two brightness images are photographed at a predetermined time interval, most likely corresponding positions are calculated by performing template matching of the two images, and each velocity in the horizontal and vertical directions is calculated based on the moving distance of the object and the photographed time interval. If pixels, of which velocity values are mutually different, coexist in the window of the template matching, the intermediate velocity is calculated because the plurality of velocity values are mixed. In other words, in the object boundary where the pixels are moving at different velocity values, the motion information (velocity) to be calculated has an error. If the second image data is the motion data, D in Expression 4 corresponds to the velocity value in the horizontal direction and the velocity value in the vertical direction.

The second image data may be an infrared image or a polarized image. In some cases the resolution of the infrared image or polarized image is lower than the RGB image, because of the influence of the chromatic aberration of the lens and the special sensor structure. In this case as well, it is likely that an error has been generated in the object boundary portion.

As the above mentioned example, the second image data is data that has an error in the boundary portion between different objects. When the second image data has a smaller data size (less data volume) than the first image data, enlargement (data interpolation) processing may be performed. In such a case, an error is generated in a region near the object boundary by the enlargement processing. The image data after this enlargement processing may be used as the second image data. For example, an image sensor to acquire the above mentioned infrared image or polarized image may include an infrared color filter or a polarizing filter only for specific pixels. In this case, the acquired infrared image or polarized image may have a smaller size compared with the RGB image, hence the enlargement processing may be performed. The second image data may be generated by an apparatus that is different from the data processing apparatus 81 and be inputted to the data processing apparatus 81, or may be generated by the data processing apparatus 81 from the first image data or other information.

As described above, if the second image data has an error and the first image data is data to be the reference for correction, subsequent processing of the weight calculation S31, statistic calculation S32, confidence coefficient calculation S33 and correction processing S34 can be performed in the same manner as Embodiment 1. Depending on the data, a plurality of correction target data may be generated, but the processing for each correction target is essentially the same. For example, in the case of motion data, the motion data correction processing in the horizontal direction and the motion data correction processing in the vertical direction are performed independently using a same method.

According to this embodiment, the confidence coefficient may be set for various data having an error, and is not limited to the depth image data. Furthermore, the data can be more accurately corrected by performing the correction processing based on the confidence coefficient.

Embodiment 3

In Embodiment 1, an error in the object boundary portion gradually changes, as shown in FIG. 4C. In Embodiment 3, the confidence coefficient is calculated and information is corrected for an image that includes an error in which the depth value of one object in the object boundary portion is approximately the same as the depth value of the other object (second image), as shown in FIG. 9. In Embodiment 3, the target is a depth image that includes an error in which a depth value of a background object is calculated as a depth value of a foreground object in the object boundary. The error type of a depth image is determined by the calculation method of the depth image.

The processing of Embodiment 3 is as shown in the flow charts in FIG. 2A to FIG. 2C, just like Embodiment 1. The data processing method of Embodiment 3 will now be described with reference to FIG. 2B, focusing on aspects that are different from Embodiment 1. In Embodiment 3, an example of processing the brightness information and depth information is described, but a same calculation can be performed for other data, as described in Embodiment 2.

The similarity calculation processing S31 is the same as Embodiment 1. In the statistic calculation processing S32, the difference between the weighted average value of each peripheral pixel depth and the depth of the correction target pixel is assumed to be the statistic T, for example.

[Math. 10]

$$T(p) = \frac{\sum_{q \in Q} W(q) D(q)}{\sum_{q \in Q} W(q)} - D(p) \quad \text{(Expression 10)}$$

Figure 10A:
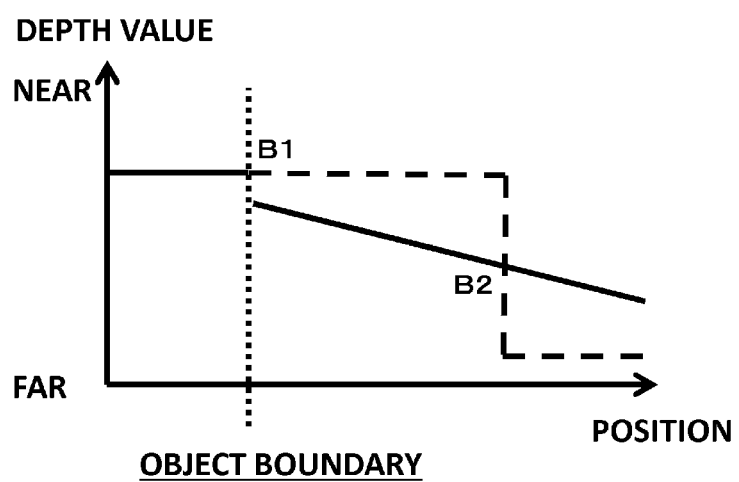
FIG. 10A and FIG. 10B are diagrams depicting confidence coefficient calculation according to Embodiment 3.
Figure 10B:
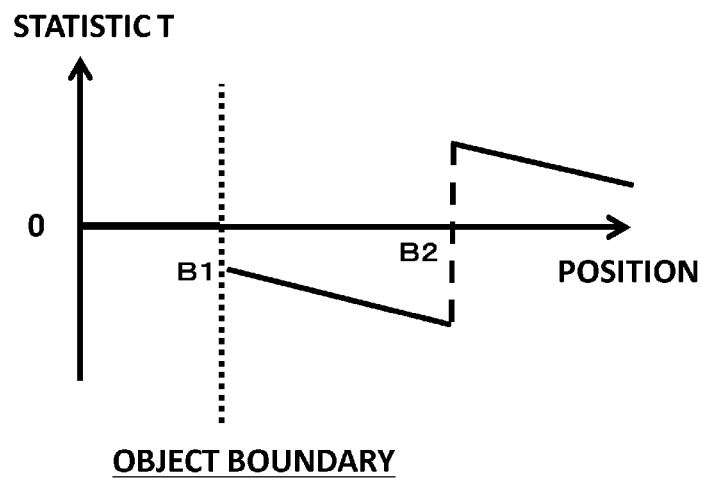

The solid line in FIG. 10A indicates the weighted average value of each peripheral pixel depth in the first term, and FIG. 10B shows the statistic T determined by Expression 10. The statistic T need not always be determined by Expression 10. The statistic T may be calculated using the confidence coefficient information calculated in advance, as shown in Expression 8. In FIG. 10A and FIG. 10B, point B1 indicates the object boundary, and point B2 indicates the boundary between an error region and an errorless region. Since the weight is determined based on the similarity of the brightness image, the depth is not averaged exceeding over point B1.

In the confidence coefficient calculation processing S33, the confidence coefficient C is determined according to the above mentioned statistic. As described above, in this embodiment, the processing target is the depth image, in which the depth value of the foreground object is calculated as the depth value of the background object, hence if the statistic T is calculated using Expression 10, the confidence coefficient can be determined based on whether the statistic T is a positive value or negative value. If the confidence coefficient indicating reliability is 1 and the confidence coefficient indicating unreliability is 0, the confidence coefficient C may be determined by the sign of the statistic T, as shown in Expression 11.

[Math. 11]

$$C(p) = \begin{cases} 1 & (T \geq 0) \\ 0 & (T < 0) \end{cases} \quad \text{(Expression 11)}$$

By this calculation method, the depth value in the range of point B1 to point B2 can be determined as unreliable. In Expression 11, the confidence coefficient is determined based on whether the statistic T is a positive value or negative value, but the weighted average depth value of each peripheral pixel and the depth value of the correction target pixel may also be different depend on the noise, even in a region other than an error region, and in such a case the value of Expression 10 could be positive or negative. In order to prevent determining a pixel that does not include an error as unreliable in such a case, C(p)=0 may be set when T<a (a<0).

According to this embodiment, a correct confidence coefficient can be set by performing statistic and confidence coefficient calculations according to the form of the error in the object boundary portion.

A concrete calculation method for the confidence coefficient must be appropriately changed depending on how the error is generated in the confidence coefficient calculation target image. For example, if the depth image includes an error where the depth value of the foreground object is calculated as the depth of the background object, the image should be determined as unreliable when statistic T, calculated by Expression 10, is positive.

(Other Examples)

The above mentioned data processing apparatus and method of the present invention can be suitably applied to an imaging apparatus, such as a digital camera and a camcorder, or to an image processing apparatus, computer or the like, which performs image processing on image data acquired by the imaging apparatus. The technique of the present invention can also be applied to various electronic apparatuses that incorporate this imaging apparatus or image processing apparatuses (including portable telephones, smartphones, straight type terminals and PCs). In the above embodiment, the functions of the image processing apparatus are incorporated into the main unit of the imaging apparatus, but the functions of the image processing apparatus can be configured in any ways. For example, the image processing apparatus may be incorporated into a computer having the imaging apparatus, so that the computer acquires an image photographed by the imaging apparatus, and executes the above mentioned image processing method based on the acquired image. The image processing apparatus may be incorporated into a computer to which network access is possible via cable or radio, so that the computer acquires a plurality of images via a network and executes the image processing method based on these images. The acquired depth information can be used for various image processing, such as the area division of an image, the generation of a 3D image and a depth image, and the emulation of the blur effect.

The data processing method can be mounted on the above mentioned apparatus by software (program) or hardware. For example, various processing to achieve the object of the present invention may be implemented by storing the program in the memory of a computer (e.g. microcomputer, FPGA) incorporated in the imaging apparatus, and allowing the computer to execute the program. A dedicated processor, such as an ASIC, to implement all or part of the processing(s) of the present invention by a logic circuit, may be preferably disposed.

The present invention can also be implemented by supplying a program to implement one or more functions of the above embodiment to the system or apparatus via a network or storage medium, so that one or more processor(s) in the computer of the system or apparatus read(s) and execute(s) the program. The present invention can also be implemented by a circuit (e.g. ASIC) that implements one or more function(s).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-218646, filed on Oct. 27, 2014, which is hereby incorporated by reference herein in its entirety.

The invention claimed is:

1. A data processing apparatus comprising:
a memory that stores a program; and
a processor that executes the program to operate as units comprising:
(a) an acquisition unit adapted to acquire image data and a depth map indicating distribution of depth information corresponding to the image data; and
(b) a correction unit adapted to generate a corrected depth map by applying filter processing to each region in the depth map by referring to a corresponding region in the image data,
wherein the correction unit performs weighted addition to depth information in a target region in the depth map using depth information in a peripheral region at a periphery of the target region to correct the depth information in the target region, thereby generating the corrected depth map,
wherein, in the weighted addition, a weight for depth information at a second position is set greater compared to a weight for depth information at a first position, wherein the second position is closer in the depth map to the target region than the first position is, and
wherein, in the weighted addition, a weight for depth information at a position corresponding to a position in the image data having a second pixel value is set greater compared to a weight for depth information at a position corresponding to a position in the image data having a first pixel value, wherein the second pixel value is closer to a pixel value of image data at a position corresponding to the target region than the first pixel value is.

2. The data processing apparatus according to claim 1, wherein the units further comprise a determination unit adapted to determine reliability of the depth map on the basis of the image data, and
wherein the correction unit is further adapted to generate the corrected depth map by applying a weight according to the reliability to depth information for use in generating the corrected depth map.

3. The data processing apparatus according to claim 2, wherein the determination unit is further adapted to determine that a reliability for a region with less texture in the image data is lower compared to a reliability for a region with greater texture.

4. A imaging apparatus comprising:
an imaging element; and
the data processing apparatus according to claim 1.

5. A data processing method comprising:
acquiring image data and a depth map indicating distribution of depth information corresponding to the image data; and
generating a corrected depth map by applying filter processing to each region in the depth map by referring to a corresponding region in the image data,
wherein generating the corrected depth map comprises performing weighted addition to depth information in a target region in the depth map using depth information in a peripheral region at a periphery of the target region to correct the depth information in the target region,
wherein, in the weighted addition, a weight for depth information at a second position is set greater compared to a weight for depth information at a first position, wherein the second position is closer in the depth map to the target region than the first position is, and
wherein, in the weighted addition, a weight for depth information at a position corresponding to a position in the image data having a second pixel value is set greater compared to a weight for depth information at a position corresponding to a position in the image data having a first pixel value, wherein the second pixel value is closer to a pixel value of image data at a position corresponding to the target region than the first pixel value is.

6. A non-transitory computer-readable storage medium storing a program which, when executed by a computer, causes the computer to execute a method comprising:
acquiring image data and a depth map indicating distribution of depth information corresponding to the image data; and
generating a corrected depth map by applying filter processing to each region in the depth map by referring to a corresponding region in the image data,
wherein generating the corrected depth map comprises performing weighted addition to depth information in a target region in the depth map using depth information in a peripheral region at a periphery of the target region to correct the depth information in the target region, wherein, in the weighted addition, a weight for depth information at a second position is set greater compared to a weight for depth information at a first position, wherein the second position is closer in the depth map to the target region than the first position is, and wherein, in the weighted addition, a weight for depth information at a position corresponding to a position in the image data having a second pixel value is set greater compared to a weight for depth information at a position corresponding to a position in the image data having a first pixel value, wherein the second pixel value is closer to a pixel value of image data at a position corresponding to the target region than the first pixel value is.

7. A data processing apparatus comprising:
a memory that stores a program; and
a processor that executes the program to operate as units comprising:
(a) an acquisition unit adapted to acquire image data and a map comprising a plurality of data each corresponding to each region of the image data; and
(b) a correction unit adapted to generate a corrected map by applying filter processing to each region in the map by referring to a corresponding region in the image data,
wherein the correction unit performs weighted addition to data in a target region in the map using data in a peripheral region at a periphery of the target region to correct the data in the target region, thereby generating the corrected depth map,
wherein, in the weighted addition, a weight for data at a second position is set greater compared to a weight for data at a first position, wherein the second position is closer in the map to the target region than the first position is, and
wherein, in the weighted addition, a weight for data at a position corresponding to a position in the image data having a second pixel value is set greater compared to a weight for data at a position corresponding to a position in the image data having a first pixel value, wherein the second pixel value is closer to a pixel value of image data at a position corresponding to the target region than the first pixel value is.

8. The data processing apparatus according to claim 7, wherein the units further comprise a determination unit adapted to determine reliability of the map on the basis of the image data, and
wherein the correction unit is further adapted to generate the corrected map by applying a weight according to the reliability to data for use in generating the corrected map.

9. The data processing apparatus according to claim 8, wherein the determination unit is further adapted to determine that a reliability for a region with less texture in the image data is lower compared to a reliability for a region with greater texture.

10. A imaging apparatus comprising:
an imaging element; and
the data processing apparatus according to claim 7.

11. A data processing method comprising:
acquiring image data and a map comprising a plurality of data each corresponding to each region of the image data; and
generating a corrected map by applying filter processing to each region in the map by referring to a corresponding region in the image data,
wherein generating the corrected map comprises performing weighted addition to data in a target region in the map using data in a peripheral region at a periphery of the target region to correct the data in the target region,
wherein, in the weighted addition, a weight for data at a second position is set greater compared to a weight for data at a first position, wherein the second position is closer in the map to the target region than the first position is, and
wherein, in the weighted addition, a weight for data at a position corresponding to a position in the image data having a second pixel value is set greater compared to a weight for data at a position corresponding to a position in the image data having a first pixel value, wherein the second pixel value is closer to a pixel value of image data at a position corresponding to the target region than the first pixel value is.

12. A non-transitory computer-readable storage medium storing a program which, when executed by a computer, causes the computer to execute a method comprising:
acquiring image data and a map comprising a plurality of data each corresponding to each region of the image data; and
generating a corrected map by applying filter processing to each region in the map by referring to a corresponding region in the image data,
wherein generating the corrected map comprises performing weighted addition to data in a target region in the map using data in a peripheral region at a periphery of the target region to correct the data in the target region,
wherein, in the weighted addition, a weight for data at a second position is set greater compared to a weight for data at a first position, wherein the second position is closer in the map to the target region than the first position is, and
wherein, in the weighted addition, a weight for data at a position corresponding to a position in the image data having a second pixel value is set greater compared to a weight for data at a position corresponding to a position in the image data having a first pixel value, wherein the second pixel value is closer to a pixel value of image data at a position corresponding to the target region than the first pixel value is.

* * * * *